United States Patent
Sarkar et al.

(10) Patent No.: US 9,119,092 B1
(45) Date of Patent: Aug. 25, 2015

(54) PERFORMANCE BASED SELECTION OF CHANNEL ELEMENTS FOR USE IN A WIRELESS NETWORK

(75) Inventors: Debasish Sarkar, Irvine, CA (US); Deveshkumar Rai, Overland Park, KS (US); Sachin R. Vargantwar, Overland Park, KS (US); Siddharth S. Oroskar, Overland Park, KS (US); Manoj Shetty, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 2054 days.

(21) Appl. No.: 12/116,011

(22) Filed: May 6, 2008

(51) Int. Cl.
| | |
|---|---|
| *H04W 72/00* | (2009.01) |
| *H04W 28/02* | (2009.01) |
| *H04W 72/08* | (2009.01) |
| *H04W 72/12* | (2009.01) |
| *H04W 36/06* | (2009.01) |
| *H04W 36/30* | (2009.01) |

(52) U.S. Cl.
CPC .......... *H04W 28/0236* (2013.01); *H04W 36/06* (2013.01); *H04W 36/30* (2013.01); *H04W 72/082* (2013.01); *H04W 72/085* (2013.01); *H04W 72/1226* (2013.01)

(58) Field of Classification Search
CPC ..... H04W 24/08; H04W 24/02; H04W 36/16; H04W 24/04; H04W 36/14; H04W 36/24; H04W 36/30; H04W 72/1226; H04W 28/0236
USPC .............. 370/437; 455/62, 434, 435.1, 435.2, 455/435.3, 450, 452.1, 452.2, 509, 512, 455/513, 514
See application file for complete search history.

(56) References Cited

U.S. PATENT DOCUMENTS

| | | | |
|---|---|---|---|
| 5,280,630 A | * | 1/1994 | Wang .................... 455/452.2 |
| 5,513,379 A | | 4/1996 | Benveniste et al. |
| 5,715,526 A | | 2/1998 | Weaver, Jr. et al. |
| 5,722,073 A | | 2/1998 | Wallstedt et al. |
| 5,752,161 A | | 5/1998 | Jantti et al. |
| 5,777,990 A | | 7/1998 | Zehavi et al. |
| 5,864,547 A | | 1/1999 | Strodtbeck et al. |
| 5,978,368 A | | 11/1999 | Hjelm et al. |
| 6,112,092 A | * | 8/2000 | Benveniste ............ 455/450 |
| 6,198,937 B1 | | 3/2001 | DeClerck et al. |
| 6,278,882 B1 | | 8/2001 | Choi |
| 6,421,529 B1 | | 7/2002 | Wing et al. |
| 6,473,411 B1 | | 10/2002 | Kumaki et al. |

(Continued)

OTHER PUBLICATIONS

U.S. Appl. No. 10/789,860, filed Feb. 27, 2004.

*Primary Examiner* — Olumide T Ajibade Akonai

(57) ABSTRACT

A method and apparatus for selecting channel elements in a wireless communication system based on their performance history. Data is collected indicating the performance of various channel elements over time, preferably eliminating from consideration any performance degradation due to air interface (e.g., radio frequency) issues. The data is then used to sort the channel elements in a priority order, from best-performing to worst-performing. When a channel element is to be selected for use in connection with an air interface channel (e.g., traffic channel or control channel), the channel element is then selected in accordance with the priority order, such as by selecting the channel element that has performed best over time. The priority-based selection of channel elements can thus leave poor-performing channel elements for use as a last resort, which can be advantageous in times of heavy network loading for instance.

20 Claims, 4 Drawing Sheets

(56) References Cited

U.S. PATENT DOCUMENTS

| | | |
|---|---|---|
| 6,496,475 B1 * | 12/2002 | Ji et al. .......... 370/216 |
| 6,625,134 B1 | 9/2003 | Ji et al. |
| 6,631,121 B1 | 10/2003 | Yoon |
| 6,671,265 B1 | 12/2003 | Hwang et al. |
| 6,826,718 B1 | 11/2004 | Wu |
| 6,944,449 B1 * | 9/2005 | Gandhi et al. ........ 455/425 |
| 6,950,416 B1 | 9/2005 | Feuerstein et al. |
| 7,107,037 B1 | 9/2006 | Talley et al. |
| 7,133,681 B1 | 11/2006 | Talley et al. |
| 7,161,912 B1 | 1/2007 | Dajer et al. |
| 7,218,928 B2 * | 5/2007 | Park et al. .......... 455/423 |
| 7,336,956 B2 * | 2/2008 | Halonen et al. ....... 455/450 |
| 7,430,401 B2 * | 9/2008 | Rajala ............ 455/67.7 |
| 2003/0108030 A1 | 6/2003 | Gao |
| 2005/0164742 A1 | 7/2005 | Rajkotia |
| 2006/0203738 A1 * | 9/2006 | Fok et al. .......... 370/252 |
| 2006/0270414 A1 * | 11/2006 | Veerasamy et al. ..... 455/452.1 |

* cited by examiner

PERFORMANCE BASED SELECTION OF CHANNEL ELEMENTS FOR USE IN A WIRELESS NETWORK

BACKGROUND

In a typical cellular wireless communication system (wireless telecommunications network), an area is divided geographically into a number of cell sites, each defined by a radio frequency (RF) radiation pattern from a respective base station. The base stations of the cells are then coupled to a switch or gateway (hereafter "switching system") that provides connectivity with a transport network and/or to a signaling network. When a wireless client station, such as a cellular telephone, personal digital assistant, pager, or appropriately equipped portable computer, for instance, is positioned in a cell, the client station may then communicate via an RF air interface with the base station of the cell. Consequently, a communication path can be established between the client station and the network, via the air interface, the base station and the switching system.

As a general matter, each base station (or, more generally, cell site) in the system will typically include a number of channel element cards that pass communications between the air interface and the switching system. Each channel element card may support transmission of communications on a number of air interface communication channels (e.g., air interface channels, whether traffic channels or control channels) at once. In turn, a wireline trunk (e.g., a T1 line) or other link will typically couple a group of channel element cards with the switching system, transporting multiple communications at once between the cell site and the switching system.

The switching system will then typically function to control operation of the various base transceiver stations e.g., (i) controlling handoff as mobile client stations move between base stations, and (ii) controlling allocation of air interface resources. Additionally, the switching system may function as a transcoder, to convert the protocol of communications being passed between the air interface and downstream network elements. For instance, in a Code Division Multiple Access (CDMA) network, the air interface may carry voice signals as Enhanced Variable Rate Codec (EVRC) encoded data, while the transport network may carry voice signals as Pulse Code Modulation (PCM) encoded data. In such a network, the switching system may include a mechanism to convert between EVRC and PCM, so as to allow voice communications to pass seamlessly between the air interface and the transport network. Other examples are possible as well.

Generally speaking, the switching system may include a number of handler modules that will function to handle cell site communications, such as to perform the protocol conversion function noted above for instance. The handler cards may then be coupled to a switching processor, which functions to route communications between the handler cards and the transport network and/or signaling network.

In operation, communications may thus pass from client stations over the air interface and through cell site channel element cards, over a T1 line to the switching system. At the switching system, the communications may then pass through handler cards to the switching processor, which may then route the communications onto a transport or signaling network. Similarly, communications may pass from a network to the switching processor and in turn through protocol handler cards and over a T1 line to a cell site. At the cell site, channel element cards may then pass the communications along to the air interface, for transmission to client stations.

OVERVIEW

The present disclosure stems initially from a realization that poor-performing channel elements (e.g., channel element cards or portions thereof) can adversely impact end-user experience. In particular, when a channel element malfunctions for one reason or another, there is an increased chance that communications handled by the channel element will be dropped, which is undesirable from a user perspective.

One solution to this problem is to determine when a channel element is faulty and to responsively remove the faulty channel element from service. Unfortunately, however, removing a channel element from service could leave insufficient channel element resources to serve users, which can be problematic particularly at times of heavy network load.

Disclosed herein is a more robust method for handling poor-performing channel elements. In accordance with the method, the performance of various channel elements in a cell site will be monitored over time, and the channel elements will be prioritized for selection based on their respective performance history. Optimally, channel elements that have been performing well will be given priority for selection over channel elements that have been performing poorly. However, poor performing channel elements may still be available for selection, albeit with lower priority than other channel elements.

By way of example, for each channel element respectively, data may be compiled over time, indicating the extent to which calls being served by the channel element have been dropped or have otherwise failed. Optimally, the data can be limited to data showing such call failure at times when RF conditions are otherwise good, so that the reason for call failure is more likely to be the channel element rather than poor RF conditions. The channel elements may then be sorted in order of their observed performance, from best performance to worst performance. When it comes time to select a channel element for use to serve a given communication, an available channel element may then be selected based on the sorted order. For instance, the best performing channel element (e.g., the highest ranked channel element) that is currently available could be selected for use.

Advantageously, this method can help to improve end user experience by causing better performing channel elements to be used more often. Further, by still allowing poor-performing channel elements to be used, albeit with lower priority and thus less often than better-performing channel elements, the method helps to maintain sufficient channel element resources when necessary. For instance, at times of heavy network loading, the better-performing channel elements may be used first and then, as necessary, the poor-performing channel elements may be used.

These as well as other aspects, advantages, and alternatives will become apparent to those of ordinary skill in the art by reading the following detailed description, with reference where appropriate to the accompanying drawings.

DETAILED DESCRIPTION

Figure 1:
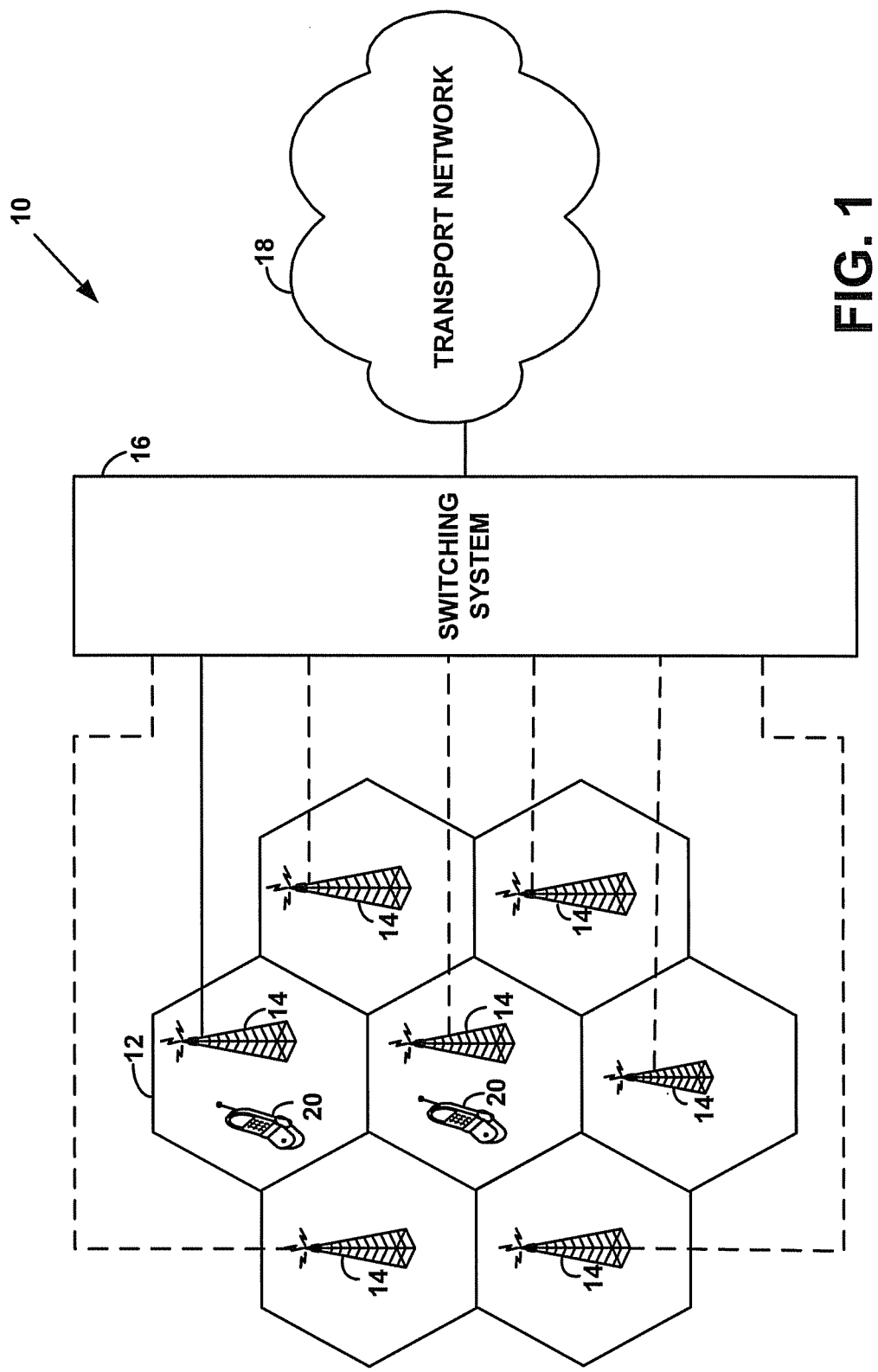
FIG. 1 is a block diagram of a wireless communication network in which the present method can be employed.

Referring to the drawings, FIG. 1 is a simplified block diagram of a wireless communications network or radio access network 10 in which an exemplary embodiment of the present method can be implemented. It should be understood, of course, that the arrangements described herein are provided as examples only, and other arrangements and other elements (e.g., machines, interfaces, functions, orders of functions, etc.) can be used instead and some elements may be omitted altogether. Further, those skilled in the art will appreciate that many of the elements described herein are functional entities that may be implemented as discrete components or in conjunction with other components, in any suitable combination and location, and that various functions described can be implemented by hardware, firmware, and/or software. For instance, various functions can be implemented by a computer processor executing program logic in data storage.

As shown in FIG. 1, network 10 includes a number of cells, cell sites, or base station sites 12, the boundaries of which are defined by one or more RF radiation patterns from antennas of a respective base stations 14. FIG. 1 depicts the coverage of each cell in an idealized fashion, as a hexagon that does not overlap other cells. In practice, however, most cells may overlap with neighboring cells and will vary widely in shape and size depending on terrain, type and strength of antenna, etc. Also in typical practice, each cell site will employ directional antennas to define various cell sectors, each of which may function as a discrete coverage area of the cell site.

As shown, the base station of each cell site is coupled with a switching system 16, which provides connectivity with a transport network 18. With this arrangement, authorized wireless client stations 20 operating within coverage of a given cell site can communicate over an air interface with the base station of the cell site and may thus communicate via the switching system with various entities on the transport network, or with other wireless client stations.

In an example arrangement, the switching system may comprise one or more base station controllers (BSC) (not shown), which function to control various aspects of base station operation and air interface operation, such as handoff of wireless client stations between various coverage areas for instance. Each BSC may then be coupled with a switch or gateway providing transport network connectivity. For instance, the BSC may be coupled with a mobile switching center (MSC) (not shown) that provides connectivity with the public switched telephone network (PSTN), and/or the BSC may be coupled with a packet data serving node (PDSN) or other gateway (not shown) that provides connectivity with a packet-switched network such as the Internet.

Variations on this example arrangement are of course possible. As one variation, for instance, functions of the BSC may be integrated into one or more of the base stations themselves or otherwise provided at a cell site. As another variation, functions of the BSC may be integrated with the MSC or with other entities. And as yet another variation, the switching system may more simply comprise a radio network gateway that provides connectivity with one or more transport networks. Numerous other variations, as well as combinations of these variations, are possible as well.

The air interface extending between a base station and wireless client stations generally defines a "forward link" carrying communications from the base station to the wireless client stations a "reverse link" carrying communications from the wireless client stations to the base station. On both the forward link and the reverse link, a given cell site may define various air interface channels, such as bearer traffic channels (e.g., for carrying user communication traffic) and control channels (e.g., access channels, paging channels, other overhead/management channels, etc.) The manner in which these channels are defined, and indeed the types and numbers of such channels will depend on the air interface protocol in use. Examples of such protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and others now known or later developed. The particular details of those channel definitions are well known are therefore not described further here.

As noted above, each cell site in a wireless network will typically include a number of channel elements that support air interface communication. Specifically, each channel element may comprise hardware elements coupled with controlling software or firmware and may implement various functions to interface between the wireless client devices the switching system. The particular functions carried out by channel elements in practice may vary depending on the air interface protocol in use and on the type of air interface channels at issue. By way of example and without limitation, a channel element may support forward link communication by performing functions such as encoding and modulation, data symbols addition, and forward power gain adjustment. Likewise, a channel element may support reverse link communications by performing functions such as demodulation, frame quality determination, and reverse power control.

In practice, the base station of a cell site may be coupled with the switching system 16 by a landline trunk such as a T1 line, or by some other link (whether wired or wireless). Because the base station may support wireless communications with multiple client stations at once, the cell site will typically functions to aggregate those multiple communications onto the link to the switching system (and vice versa for communications coming from the switching system).

In an example configuration, packetized communications pass in frame relay over a T1 line between the cell site 12 and the switching system. Each T1 line includes 24 DS-0 (Digital Signal, level 0) channels (or "DS0s"), each of which is 64 kbps. Individual communications (whether bearer communications or overhead signaling) are thus carried between the cell site and the switch on individual channels, effectively defining streams or sessions. In practice, for instance, each T1 line may carry a number of communications between a cell site and a switch, in quantities or groups that may be referred to as "packet pipes."

Figure 2:
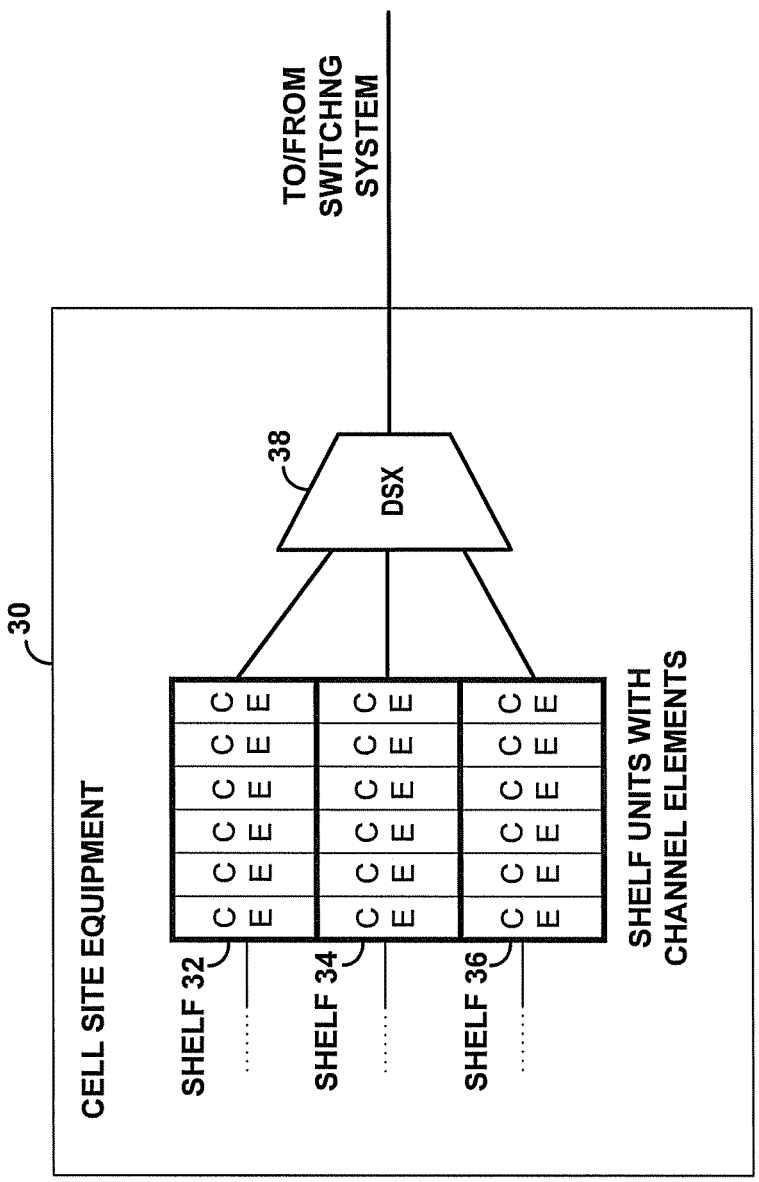
FIG. 2 is an illustration of exemplary equipment at a cell site including channel elements that may be subject to the present method.

The channel elements at a cell site may be provided in various forms. In typical practice, for instance, the channel elements may be provided on channel element cards (or other modules), where each channel element card defines multiple channel elements, and numerous channel element cards are situated in slots of a chassis or shelf. FIG. 2 depicts an example of such an arrangement, as cell site equipment 30.

As shown in FIG. 2, the cell site equipment includes a number of shelves 32, 34, 36, each including a number of slots. Depicted conceptually in each slot is a respective channel element card. In practice, each channel element card may define a single channel element arranged to support a single air interface channel. Alternatively, and more likely, each channel element card may define multiple channel elements, each arranged to support a single air interface channel. For example, and without limitation, each channel element card may define forty-eight physical channel elements, and may thus theoretically support forty-eight concurrent air interface channels. Each shelf or group of channel element cards may also have a corresponding control card for managing the various channel element cards.

With the arrangement shown, air interface communications received by channel elements of a given shelf may be aggregated by backplane circuitry, and communications from multiple shelves may then be multiplexed together by a DSX multiplexer 38 or the like onto a T1 line extending to the switching system 16. Likewise, communications from the switching system arriving at the cell site (or for that matter other communications destined for air interface transmission) may distributed to particular shelves and in turn to the appropriate channel elements for transmission on respective air interface channels.

Although it is typical for channel elements to reside at a given cell site, channel elements could just as well be provided elsewhere in the network or in association with the network. By way of example, channel elements for supporting air interface communications in a given cell site could be provided at a BSC or otherwise at the switching system serving the cell site, though such positioning may require aggregation to occur less efficiently at the switching system rather than at the cell site itself. Other arrangements are possible as well.

In some networks, channel elements are assigned in a static manner to respective channels. A disadvantage of that arrangement, however, is that the network must contain enough channel elements to support all of the necessary channels during the busiest hour of the day. Because not all cell sites have the same busy hour, and otherwise for efficiency sake, a network may instead implement a channel element pooling scheme.

In a channel element pooling scheme, a pool of channel elements is provided, and channel elements from the pool are dynamically assigned for use on an as-needed basis to support air interface channels in one or more cell cites or other defined service areas. For instance, a cell site may have a pool of such channel elements available for use to support air interface channels defined by the cell site. When a call (e.g., a voice call or data communication session (either understood to be a "call")) is being initiated or handed off into the cell site, control logic at the cell site or in another controlling entity may select an available one of the channel elements of the pool for use to support an air interface traffic channel for the call, and the call may proceed via that selected channel element. Likewise, various channel elements of the pool may be assigned at various times (e.g., depending on the hour of day and the typical need) for use to support air interface control channels, such as access channels and paging channels for instance.

In practice, a BSC at the switching system 16 may include a processor and data storage, with program logic stored in the data storage and executable by the processor to manage this dynamic channel element assignment. In the event the channel elements are located at the cell site and the BSC is located remotely, the network may be arranged to support control signaling between the BSC and the cell site, such as between the BSC and a control card included among the channel elements, such that the BSC may direct the cell site to use a particular channel element in connection with a given call. This control signaling can take various forms, using any of a variety of signaling protocols now known or later developed.

Alternatively, the dynamic assignment of channel elements can be carried out by control logic at the cell site itself (e.g., a control card among the channel elements), or in some other manner.

Figure 3:
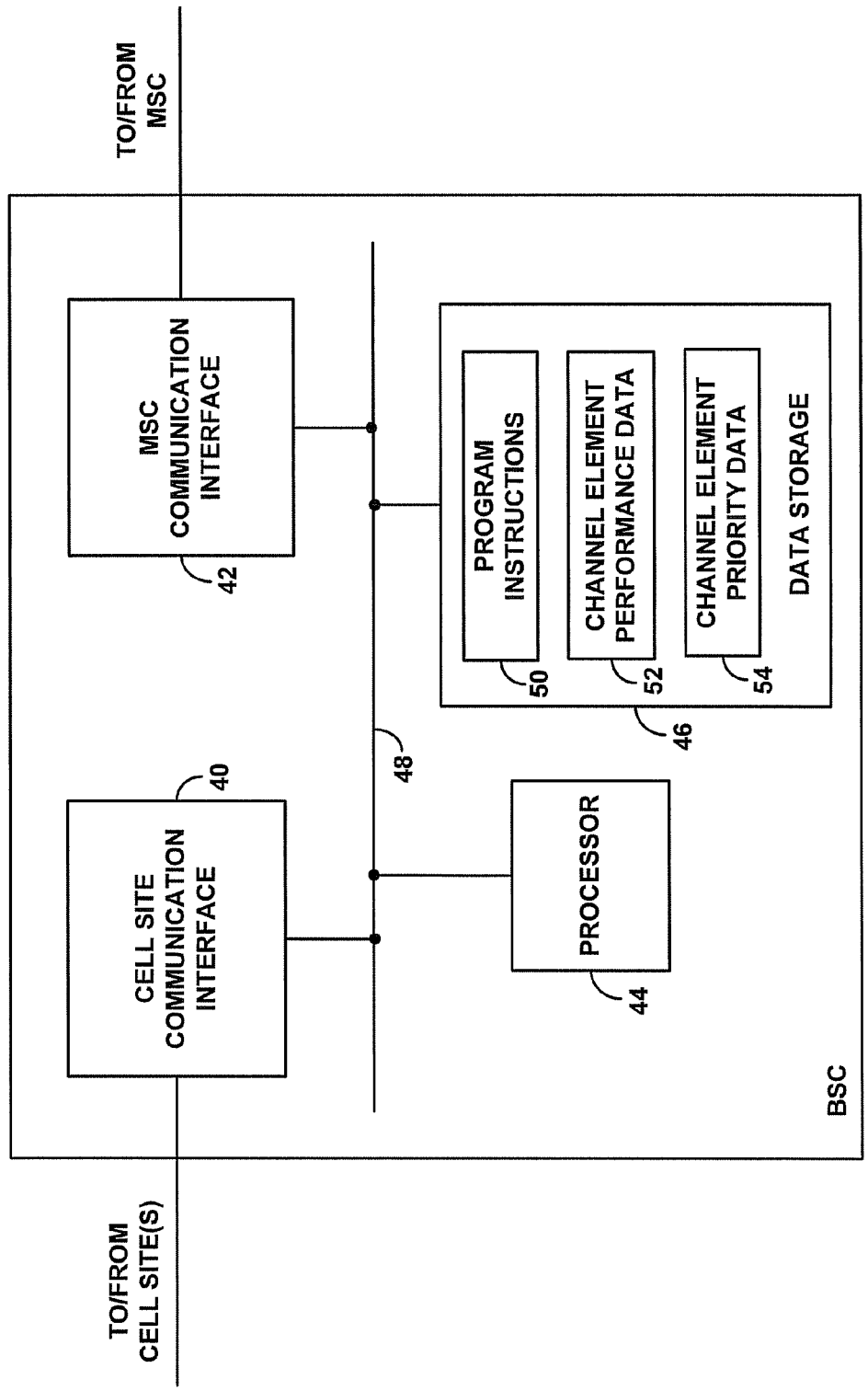
FIG. 3 is a block diagram showing components of an apparatus arranged to carry out aspects of the present method.

As noted above, the present method involves monitoring the performance history of channel elements and using that performance history as a basis to intelligently select a channel element for use in a given instance. Conveniently, this method too may be carried out by a BSC or other element of the switching system, by a controller at the cell site (or otherwise at the cell site where the channel elements are located), and/or by one or more other entities, as the method assumes dynamic assignment of channel elements from a pool. FIG. 3 is a block diagram of an exemplary BSC, showing components for carrying out these functions.

As shown in FIG. 3, the exemplary BSC includes a cell site communication interface 40, an MSC communication interface 42, a processor 44, and data storage 46, all of which may be coupled together by a system bus, network or other connection mechanism 48.

In this arrangement, the cell site communication interface 40 comprises a network interface (e.g., T1 connection interface) through which the BSC can communicate with one or more cell sites 12, to send and receive bearer traffic and signaling traffic and to communicate with the cell sites regarding channel element performance and selection of channel elements. The MSC communication interface 42, in turn, comprises a network interface through which the BSC can communicate with an MSC of the switching system 16.

Processor 44 then comprises one or more general purpose processors (e.g., INTEL processors) and/or special purpose processors (e.g., digital signal processors). And data storage 46 comprises one or more volatile and/or non-volatile storage components, such as magnetic, optical, or organic storage, which holds or is arranged to hold program instructions executable by processor 44 to carry out various functions described herein, as well as associated reference data (e.g., channel element performance data 50 and priority data 52).

Figure 4:
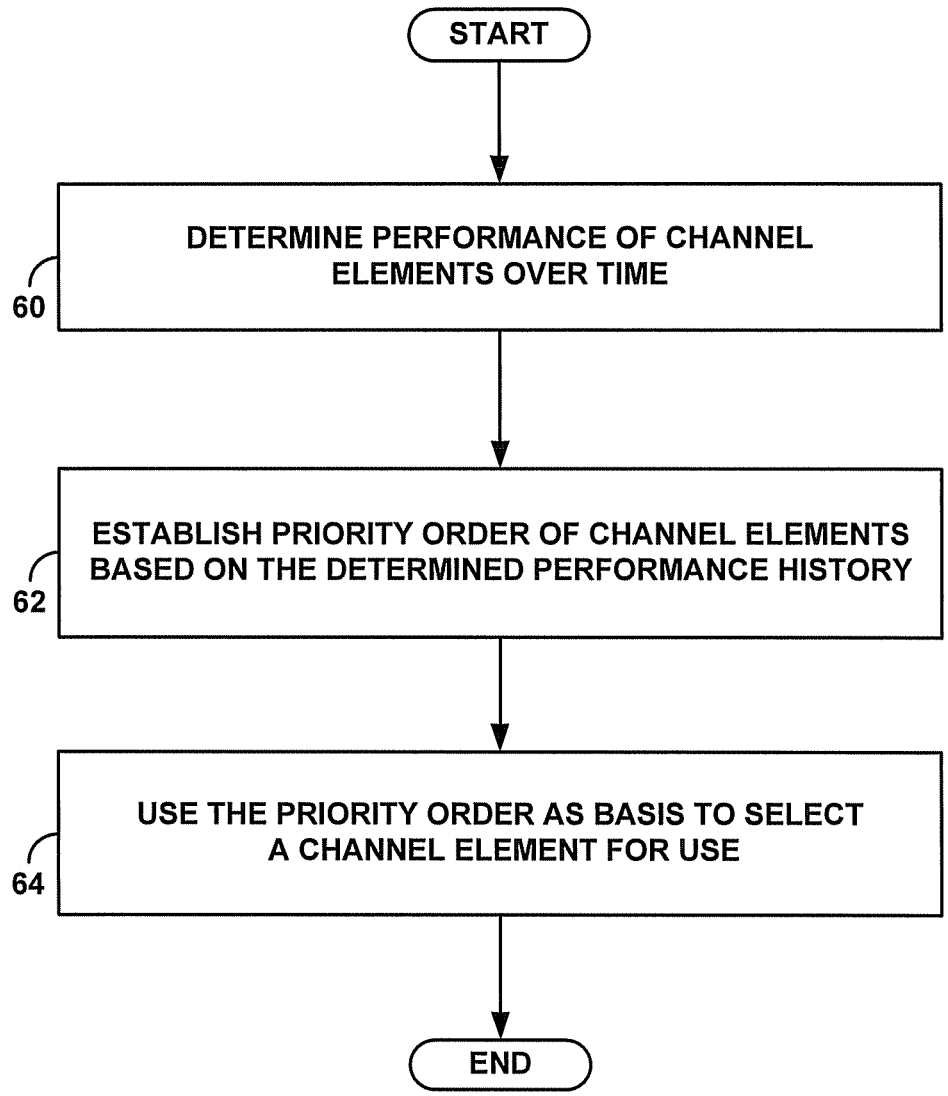
FIG. 4 is a flow chart depicting functions that can be carried out in accordance with the exemplary method.

FIG. 4 is next a flow chart depicting functions that may be carried out in accordance with the exemplary method, to manage channel elements in a wireless network and specifically to decide which channel element to use in a given instance. As shown in FIG. 4, at block 60, the method involves determining performance of the channel elements over time. At block 62, the method then involves establishing a priority order of the channel elements based on the determined performance of the channel elements over time. And at block 64, the method involves using the priority order as a basis to select a channel element for use.

Preferably, the act of monitoring performance of channel elements over time will occur continuously as a background process during normal network operation, with channel element performance data being confirmed or updated over time. In practice, for instance, a BSC may maintain in data storage 46 a performance record for each channel element under the BSC's control, including an identifier of the channel element and an indication of the channel element's determined performance. As the BSC gains new information about performance of the channel element, the BSC may then update the channel element's performance record, to indicate a latest measure of how the channel element has been performing over time, such as by averaging or counting indications of performance over time. Further, at certain times or in response to other events, the performance data for one or more channel elements may be refreshed (e.g., reset).

The BSC may evaluate performance of a channel element in various ways, examples of which are described herein without limitation (and with the understanding that other examples may now be possible or may later be developed). The performance evaluation may be based on data collected or observed by the BSC, by the cell site (e.g., by the channel element itself or by a control card or the like), and/or by one or more other entities. Numerous factors may be taken into consideration when determining past performance of a channel element. Further, while it is preferred that the performance determination accurately reflect the channel element performance, the accuracy or exactness of the determination is not critical to the present method.

A preferred measure of channel element performance call drop rate during good RF conditions. That is, the performance of a channel element can be gauged by how often calls being served by the channel element are dropped at times when the air interface conditions are likely not the cause of the call drop and thus when the channel element (rather than the air interface) is more likely the cause of the call drop. To evaluate this metric, the BSC may detect call drop events, and for each call drop event (i) determine a channel element that served the call, (ii) determine whether the air interface conditions at the time of the call drop event were sufficiently good, and (iii) count the call drop event as an indication of poor channel element performance if the determination is that the air interface conditions at the time of the call drop event were sufficiently good.

A BSC may detect a call drop event in various ways. In real time (at or about the time the call drop occurs), for instance, the BSC may conclude that a call drop occurred when communication stops flowing between the BSC and the served client station without the BSC or client station having sent an end-of-call signal or otherwise normally ended the communication session. As another example, through post-processing analysis, the BSC may review call detail records (CDRs) established by the switching system. As still another example, the cell site may detect a call drop and responsively inform the BSC.

Likewise, the BSC may determine the applicable channel element in various ways. For example, if the BSC is the entity that assigns channel elements for use as a general matter, then the BSC may maintain records indicating which channel element serve which calls. Thus, at the time of a call drop, the BSC may refer to such records to determine the serving channel element. As another example, the BSC may engage in signaling with the cell site to determine the serving channel element.

To determine whether the air interface conditions were sufficiently good at the time of the call drop event, the BSC may evaluate air interface conditions in various ways, considering one or more communication metrics. In particular, the BSC may evaluate the air interface conditions at the time of the call drop event to determine whether at least one threshold air interface communication metric justifies the call drop.

By way of example, the BSC may evaluate reverse link frame error rate (FER) and/or reverse link signal-to-noise ratio (e.g., ratio of energy to spectral interference), as measured at the cell site and reported to the BSC with respect to communications from the served client station at or about the time of the call drop event. Alternatively or additionally, the BSC may evaluate forward link FER and/or forward link signal-to-noise ratio (e.g., ratio of energy to spectral interference), as measured by the served client station and reported to the BSC for communications at or about the time of the call drop event.

If the BSC thereby determines that, at that time of the call drop event (i.e., at or about the time), the reverse link FER was at a threshold high level, the reverse link signal to noise ratio was at a threshold low level, the forward link FER was at a threshold high level, the forward link signal-to-noise ratio was at a threshold low level, then the BSC may conclude that a problem existed on the air interface and that the call drop was likely the result of the poor air interface conditions rather than poor channel element performance. On the other hand, if the BSC determines that, at the time of the call drop event, the at least one communication metric did not justify the call drop, then the BSC may factor the call drop event into the call drop rate determined for the channel element, i.e., as a call drop attributed to poor channel element performance.

The BSC may also or alternatively take into consideration other communication metrics when deciding whether something other than the channel element may be to blame for a call drop event. For instance, the BSC may evaluate data indicating the state of various hardware or software components or processes at the cell site and/or in the client station, that could result in a call drop.

Ultimately, for each call drop associated with calls served by the various channel elements, the BSC may thus determine whether at least one threshold communication metric justifies the call drop, and the BSC may factor into the call drop rates of the channel elements just those call drops that the BSC thereby determines to not be justified by at least that one communication metric.

The call drop rates that the BSC determines for the various channel elements may themselves take various forms, the particular details of which are not critical. For example, the call drop rate for each given channel element may be a count of associated call drops that occurred within a certain period of time. As another example, the call drop rate for each channel element may be a percentage or ratio of call drops to total calls handled by the channel element within a period of time, possibly averaged over time. Numerous other examples are possible as well.

In turn, the step of establishing the priority order of the channel elements based on the determined performance of the channel elements over time may also take various forms. As one example, the BSC may simply rank the channel elements in order from the channel element determined to have performed the best to the channel element determined to have performed the worst. (Ties could be dealt with randomly, or based on one or more other factors.) As another example, the BSC may rank the channel elements in classes of past performance, such as from a best class (e.g., having at most a certain low threshold call drop rate) to a worst class (e.g., having at least a certain high threshold call drop rate), with any number of classes in between. Furthermore, sub-rankings could be applied within the various classes if desired, again based on call drop rates and/or one or more other factors.

In a preferred implementation, each of the channel elements of the priority order will be operative to at least some extent, meaning that the channel element will not be entirely out of service but can function to serve an air interface channel to some extent, even if not optimally. It may be the case that other existing channel elements may be out-of-service (e.g., powered down or otherwise completely inoperative to serve an air interface channel). Those other channel elements, if any, are not the ones at issue in this method.

Further, it should be understood that the channel elements of the priority order may be channel elements that function to serve one or more types of air interface channels, examples of which include traffic channels and control channels, defined according to any of the air interface protocols noted above or others now known or later developed. This is the case even if the priority ordering is based upon past performance of channel elements serving traffic channels specifically. Thus, for instance, the BSC may rank the channel elements based on their call drop rates with respect to air interface traffic channels. But various ones of the channel elements may be later selected for use to support control channels, traffic channels, or other sorts of channels, based on that past performance. Alternatively, the process may be restricted to application with respect to one or more particular types of air interface channels.

As with the monitoring of channel element performance, the act of establishing the priority order is preferably carried out in a background process during normal operation. In practice, for instance, the BSC may maintain the priority order in data storage 46 and may update the priority order periodically or otherwise over time as the BSC gains new data regarding past performance of channel elements. Thus, when it comes time to select a channel element for use in a given instance, the BSC can use the latest priority data as a basis to select the channel element.

Selection of a channel element may occur at various times and in response to various triggering events, including but not limited to call admission events. For example, the BSC may select a channel element at the time a call is being initiated in the BSC's coverage area. As another example, the BSC may select a channel element at the time a call is being handed off from one coverage area into another coverage area, to the extent a change in channel elements is necessary in such handoff. As yet another example, the BSC may select a channel element for use in connection with a call in response to failure of a channel element currently associated with the call, as may be reported to the BSC from the cell site for instance. Again, as noted above, a channel element may be selected for use with respect to bearer traffic, control communication, and/or other sorts of channels on the air interface.

To select a channel element based on the established priority order, the BSC may select a highest ranked channel element that is currently available. In practice, for instance, the BSC may refer to data indicating which channel elements are currently in use (which may or may not be maintained in conjunction with the priority order data) and the priority order data to identify a channel element that is ranked highest in terms of past performance and that is not currently in use, and the BSC may select that channel element for use. In the event the priority order classifies channel elements into classes of past performance, the BSC may first attempt to select a channel element from the class of best performing channel elements. If no such channel elements are available, the BSC may then attempt to select a channel element from the next best class, and so forth, through the worst-performing class of channel elements if necessary.

Once the BSC selects a channel element, the BSC may then signal to the cell site to direct use of the channel element. The particular signaling between the BSC and the cell site is not critical and can thus take any form desired. By way of example, generic IP messaging could be used between the BSC and a control card at the channel element chassis.

Further, as noted generally above, the present method or steps of the method could equally be carried out by or at the cell site itself or more generally by any apparatus suitably situated and arranged in (i.e., in or with respect to) a radio access network, in which case some or all of the channel element related communications described herein may not occur. Like the BSC described above, such an apparatus would preferably have a processor, data storage, and program logic stored in the data storage that are executable by the processor (i) to determine performance of the channel elements over time, (ii) to establish a priority order of the channel elements based on the determined performance of the channel elements over time, and (iii) based on the established priority order, to select a channel element for use.

As explained above, an advantage of the present method is that channel elements that are deemed to have been performing poorly can still be made available for use, albeit with lower priority (and thus perhaps less often) than channel elements that are deemed to have been performing well. Thus, during times of high loading (e.g., peak wireless traffic), the chances of being able to serve a call rather than altogether blocking the call can be increased.

An exemplary embodiment has been described above. Those skilled in the art will appreciate that numerous variations from the embodiment described are possible while remaining within the scope and spirit of the invention as claimed.

We claim:

1. A method of managing channel elements in a wireless network, the method comprising:
    determining performance of the channel elements over time;
    establishing a priority order of the channel elements based on the determined performance of the channel elements over time; and
    based on the established priority order, selecting a channel element for use,
    wherein determining performance of the channel elements over time comprises determining call drop rates for the channel elements, and wherein establishing the priority order of the channel elements based on the determined performance of the channel elements over time comprises ordering the channel elements at least in part based on the determined call drop rates, and
    wherein determining call drop rates for the channel elements comprises for each channel element, identifying call drops for calls served by the channel element and for each identified call drop, (i) determining whether at least one air interface condition was threshold poor when the call drop occurred, (ii) if the determination is that the at least one air interface condition was not threshold poor when the call drop occurred, then factoring the call drop into the call drop rate for the channel element and (iii) if the determination is that the at least one air interface condition was threshold poor when the call drop occurred, then not factoring the call drop in the call drop rate for the channel element.

2. The method of claim 1, further comprising maintaining call records indicating, respectively for each of a plurality of calls, which channel element served the call, and a disposition of the call including, if the call was dropped, an indication that the call was dropped,
    wherein determining the call drop rates comprises evaluating the maintained call records as a basis to determine the call drop rates.

3. The method of claim 1, wherein the at least one air interface condition being threshold poor comprises reverse link frame error rate being threshold high.

4. The method of claim 1, wherein the at least one air interface condition being threshold poor comprises forward link frame error rate being threshold high.

5. The method of claim 1, wherein the at least one air interface condition being threshold poor comprises reverse link signal to noise ratio being threshold low.

6. The method of claim 1, wherein the at least one air interface condition being threshold poor comprises forward link signal to noise ratio being threshold low.

7. The method of claim 1,
wherein establishing the priority order of the channel elements comprises ranking the channel elements in order from channel element determined to have performed best to channel element determined to have performed worst; and
selecting a channel element for use based on the established priority order comprises selecting a highest ranked available channel element in the ranked order.

8. The method of claim 1, wherein the channel elements are located at a base station site, the method further comprising carrying out the method at the base station site.

9. The method of claim 1, wherein each of the channel elements of the priority order is operative, rather than out-of-service.

10. The method of claim 1, wherein the channel elements serve air interface channels including traffic channels and control channels.

11. The method of claim 1, wherein the air interface traffic channels comprise code division multiple access (CDMA) channels.

12. The method of claim 1, wherein the channel elements are provided on channel element cards.

13. The method of claim 1, wherein selecting a channel element for use comprises selecting, at initiation of a call, a channel element for use to facilitate the call.

14. The method of claim 1, wherein selecting a channel element for use comprises selecting, at handoff of a call into a coverage area of the wireless network, a channel element for use to facilitate the call in the coverage area.

15. A method of managing channel elements in a wireless network, the method comprising:
determining call drop rates for the channel elements, wherein determining call drop rates for the channel elements comprises for each channel element, identifying call drops for calls served by the channel element and for each identified call drop, (i) determining whether at least one air interface condition was threshold poor when the call drop occurred, (ii) if the determination is that the at least one air interface condition was not threshold poor when the call drop occurred, then factoring the call drop into the call drop rate for the channel element and (iii) if the determination is that the at least one air interface condition was threshold poor when the call drop occurred, then not factoring the call drop in the call drop rate for the channel element;
establishing a priority order of the channel elements based on the determined call drop rates of the channel elements over time, wherein establishing the priority order of the channel elements comprises ranking the channel elements in order from channel element determined to have performed best to channel element determined to have performed worst, and wherein each channel element of the priority order is operative at least to some extent; and
based on the established priority order, selecting a channel element for use.

16. An apparatus operable in a radio access network (RAN), the RAN having one or more base stations radiating to define one or more wireless coverage areas for serving wireless client devices, and the RAN including a plurality of channel elements that serve air interface channels for carrying communications wirelessly between the RAN and the wireless client device, the apparatus comprising:
a processor;
data storage; and
program logic stored in the data storage and executable by the processor (i) to determine performance of the channel elements over time, (ii) to establish a priority order of the channel elements based on the determined performance of the channel elements over time, and (iii) based on the established priority order, to select a channel element for use,
wherein determining performance of the channel elements over time comprises determining call drop rates for the channel elements, and wherein establishing the priority order of the channel elements based on the determined performance of the channel elements over time comprises ordering the channel elements at least in part based on the determined call drop rates, and
wherein determining call drop rates for the channel elements comprises for each channel element, identifying call drops for calls served by the channel element and for each identified call drop, (i) determining whether at least one air interface condition was threshold poor when the call drop occurred, (ii) if the determination is that the at least one air interface condition was not threshold poor when the call drop occurred, then factoring the call drop into the call drop rate for the channel element and (iii) if the determination is that the at least one air interface condition was threshold poor when the call drop occurred, then not factoring the call drop in the call drop rate for the channel element.

17. The apparatus of claim 16, wherein the at least one air interface condition being threshold poor comprises reverse link frame error rate being threshold high.

18. The apparatus of claim 16, wherein the at least one air interface condition being threshold poor comprises forward link frame error rate being threshold high.

19. The apparatus of claim 16, wherein the at least one air interface condition being threshold poor comprises reverse link signal to noise ratio being threshold low.

20. The apparatus of claim 16, wherein the at least one air interface condition being threshold poor comprises forward link signal to noise ratio being threshold low.

* * * * *